United States Patent Office 3,534,326
Patented Oct. 13, 1970

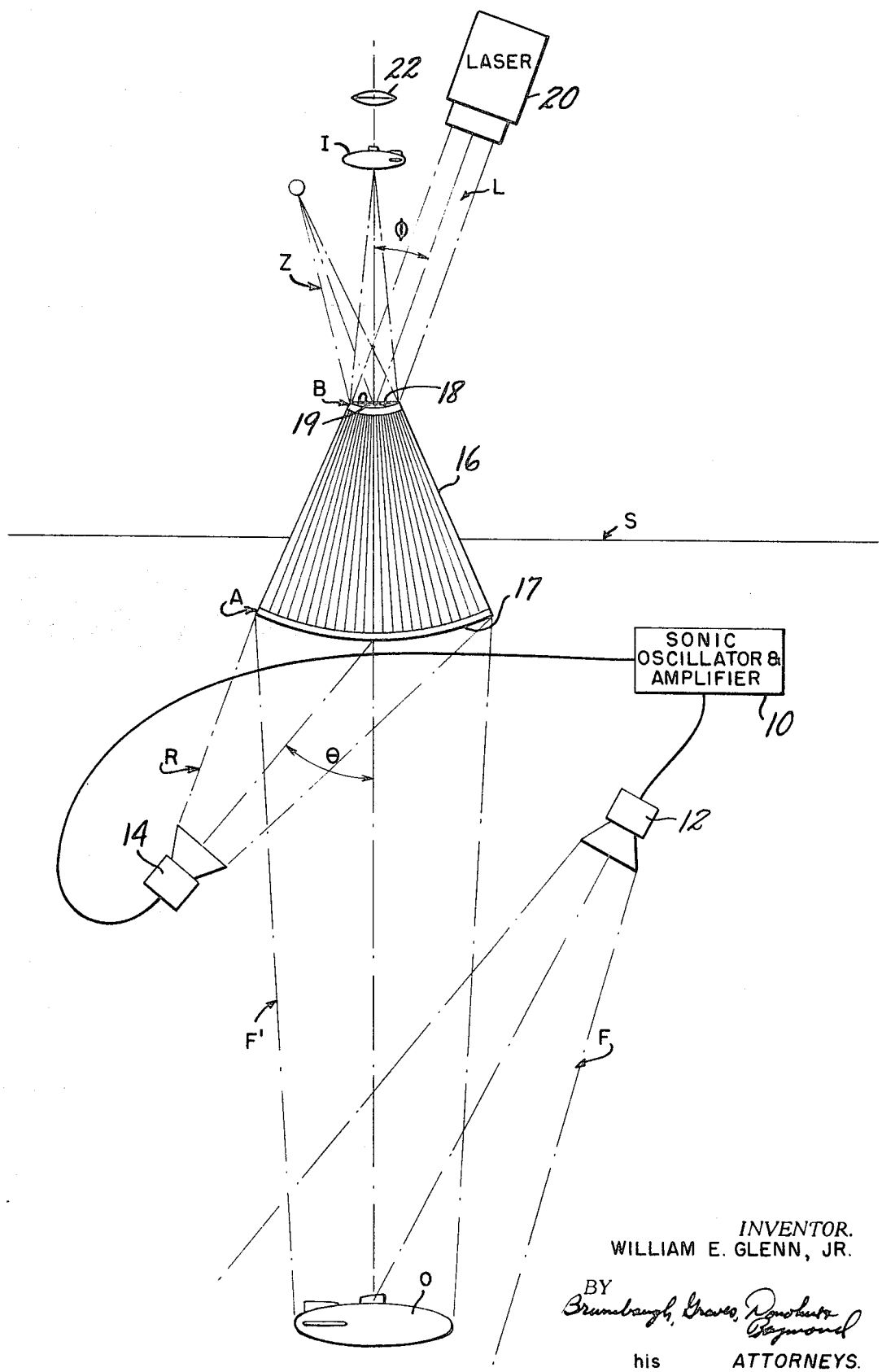

3,534,326
DIRECT ACOUSTICAL TO OPTICAL CONVERSION FOR UNDERWATER IMAGING
William E. Glenn, Jr., Stamford, Conn., assignor to Columbia Broadcasting System, Inc., New York, N.Y., a corporation of New York
Filed May 29, 1969, Ser. No. 829,052
Int. Cl. G01s 9/66
U.S. Cl. 340—1        11 Claims

ABSTRACT OF THE DISCLOSURE

A first transducer emits an ultrasonic flooding wave which can be reflected from an object in water and a second transducer emits an ultrasonic reference wave that intersects the reflected wave. The reference and reflected waves form an interference pattern of ripples in the water. A bundle of tapered rods of energy-transmitting material is partially submerged in the water and transmits the energy of the ripple pattern from its larger, submerged end to a fluid surface on its other end, thus forming an interference pattern with an increased amplitude and reduced size. The transmitted interference pattern is converted to an optical image by directing coherent light onto the fluid surface at an angle proportional to the angle between the reference wave and the reflected wave.

BACKGROUND OF THE INVENTION

It is possible to form a ripple pattern on the surface of water from an ultrasonic interference pattern by flooding an area under the water with an ultrasonic wave which, when reflected from an object, is mixed with an ultrasonic reference wave. An optical image of the object struck by the flooding wave can be produced by illuminating the ripple pattern with laser light.

Thus far, this technique is applicable only to objects which are relatively close to the surface of the water and are relatively small. The limitation as to range is due to the fact that the radiation pressure from the interference pattern, which pressure causes the ripple pattern, is very small. In practice, the range of this technique has been limited to about three feet. The limitation as to size exists because of the difference between the wavelength of ultrasonic waves and light waves. Because the wavelength of sound is so much longer than the wavelength of light, it is undesirable to form the interference pattern in full size. If the pattern is full sized, it results in a very small optical image and cannot be accommodated by practical sized viewing facilities.

Because of the range and size limitations, the technique described above has had relatively little use in practical applications. However, such a technique, having the capability of operating over a long range while reducing the size of the interference pattern and increasing the size of the optical image, would greatly facilitate undersea searches and explorations. Also, an improved technique, as described above, would find many other practical uses.

SUMMARY OF THE INVENTION

The invention described herein provides a system that is capable of operating at long ranges and reducing the size of the interference pattern and increasing the size of the optical image. In accordance with the invention, a bundle of tapered sound energy transmitting rods is introduced into the system. The large end of the bundle is placed in the water and a film of fluid with a free surface thereon is located at its small end and projects above the surface of the water or through the hull of a vessel. The acoustical interference pattern is formed as described above and impinges on the large end of the bundle and is transmitted to the fluid surface where it forms a ripple pattern having a much higher amplitude and in a much smaller size. The ripple pattern is illuminated with coherent light from a laser at an angle proportional to the angle between the reference wave and reflected wave that forms the interference pattern, thus producing the optical image.

BRIEF DESCRIPTION OF THE DRAWING

In order to more clearly understand the principles embodied in this invention, reference is made to the following description of a preferred embodiment thereof taken with the accompanying drawing, in which a system for converting acoustical waves to an optical image in accordance with this invention is shown schematically.

DESCRIPTION OF THE PREFERRED EMBODIMENT

A sonic oscillator and amplifier 10, of any suitable type, drives a first transducer 12 that emits a coherent, ultrasonic wave F flooding a particular area underwater. A second transducer 14, also driven by the oscillator and amplifier 10 and at the same frequency as the transducer 12, emits a coherent, ultrasonic reference wave R directed toward the surface 17 of the rods 16. When the flooding wave F strikes an object O underwater, it will be reflected therefrom (as shown at F') toward the surface of the rods and will intersect the reference wave R at an angle $\theta$ to form an interference pattern in the water. It should be noted that the interference pattern is a standing pattern. The radiation pressure from this interference pattern would, if the object O were located relatively close to the surface of the water, form a ripple pattern on the surface of the water from which an optical image could be formed.

As pointed out previously, this technique is limited in range due to the fact that the radiation pressure causing the ripple pattern is very small. Radiation pressure, however, increases with the square of the energy density and this invention includes a device that increases the energy density of the interference pattern, thereby increasing the radiation pressure and amplitude of the deformation of the fluid surface.

In order to increase the energy density, this invention utilizes energy-transmitting rods tapered linearly, exponentially, or in another suitable manner from a large area to a much smaller area. A plurality of such rods forms an intensifier 16 having a large end 17 and a small end 18 on which a thin film of fluid 19 having a free surface is located. For a purpose to be fully explained hereinafter, the small end 18 of the bundle forms a slightly concave spherical surface. The intensifier rods could be of any suitable type that transmits sound energy with a very low loss, one such type being manufactured by E. I. du Pont de Nemours and Company under the trademark Crofon.

The intensifier 16 is placed in the water with its large end 17 at the position of the acoustical interference pattern and with its smaller end 18 and fluid surface 19 projecting into air. The interference pattern formed by the ultrasonic waves F' and R impinges on the face of the large end of the intensifier and is transmitted to its small end where it forms a ripple pattern on the fluid 19.

A laser light source 20 is provided and directs coherent light L onto the fluid 19 at an angle $\phi$ to the optical axis of the image to be formed. The angle $\phi$ is proportional to the angle $\theta$ formed between the reflected and reference sound waves according to the following equation:

$$\sin \Phi = \sin \Theta \left( \frac{W_L}{W_S} \frac{A}{B} \right)$$

where $W_L$ is the wavelength of light, $W_S$ is the wavelength of sound, A is a linear dimension of the large end 18 of the intensifier, and B is a corresponding linear dimension of the small end 16 of the intensifier. By striking the fluid 19 at this angle, an optical image I of the object O will be reflected and will focus at the first order diffraction point. This reflection can be viewed through a suitable field lens 22. Due to the slightly spherical surface 18 of the intensifier, a zero order reflection Z will focus at a point in space spaced from the optical image I.

It should be apparent, that the size of the interference pattern is reduced by the intensifier in a ratio of B/A.

As an example of the increased range that can be attained with this invention, if the energy-transmitting rods taper in a linear difference by a factor of $10^2$, the energy density will increase by a factor of $10^4$ and the resulting radiation pressure will be greater by a factor of $10^8$. The energy reflected from an underwater object decreases as the inverse fourth power of the distance, and in the example given above, the radiation pressure increases as the fourth power of the linear concentration of the sound-transmitting rods. Consequently, the range of an imaging system according to this invention should increase proportional to the linear difference of the rods. As pointed out previously, prior to this invention, imaging systems have been constructed with ranges of approximately 3 feet. By utilizing the rods described above, a range of 300 feet can be provided.

While in the above there has been described an exemplary embodiment of this invention, many modifications will appear to those skilled in the art. Accordingly, all such modifications are included within the intended scope of this invention.

I claim:

1. A system for converting an ultrasonic image into an optical image comprising, means for generating an ultrasonic flooding wave adapted to be reflected from an object, means for generating an ultrasonic reference wave adapted to form an interference pattern with the wave reflected from an object, intensifier means for increasing the energy density of the interference pattern, and means for emitting a reference light wave and directing it at the denser interference pattern so as to produce an optical image.

2. A system as defined in claim 1 wherein the intensifier means comprises tapered rods of sound energy transmitting material.

3. A system as defined in claim 1 wherein the intensifier means has a thin film of fluid with a free surface on it to which the denser interference pattern is transmitted.

4. A system as defined in claim 1 wherein the intensifier means also reduces the size of the interference pattern.

5. A system for converting an ultrasonic image into an optical image comprising, means for generating an ultrasonic flooding wave adapted to be reflected from an object, means for generating an ultrasonic reference wave adapted to form an interference pattern with the wave reflected from an object, intensifier means for reducing the size of the interference pattern, and means for emitting a reference light wave and directing it at the smaller interference pattern so as to produce an optical image.

6. A system as defined in claim 5 wherein the intensifier means comprises tapered rods of sound energy transmitting material.

7. A system as defined in claim 5 wherein the intensifier means has a thin film of fluid with a free surface on it to which the smaller interference pattern is transmitted.

8. An energy transmitter comprising a bundle of tapered rods each having a core for transmitting sound energy at a low loss, one end of the bundle being large in cross-section and the other end of the bundle being small in cross section, and a thin film of fluid located on the small end of the bundle.

9. An energy transmitter as defined in claim 8 wherein the small end of the bundle has a slightly concave spherical surface on which the film of fluid rests.

10. An energy transmitter as defined in claim 8 wherein the rods are tapered exponentially.

11. An energy transmitter as defined in claim 8 wherein the rods are tapered linearly.

References Cited

UNITED STATES PATENTS 3,295,629   1/1967   Papadakis _____ 181—0.5

OTHER REFERENCES

Mueller et al., Applied Physics Letters, November 1966, vol. 9, No. 9, pp. 238, 329.

RICHARD A. FARLEY, Primary Examiner

U.S. Cl. X.R.

340—3, 5; 181—0.5